March 2, 1965  N. E. L. NYDÉN  3,171,452
DEVICE FOR CLASSIFYING BOARDS AS TO QUALITY AND
TRIMMING THEM TO DESIRED LENGTHS
Filed Feb. 12, 1962  3 Sheets-Sheet 1
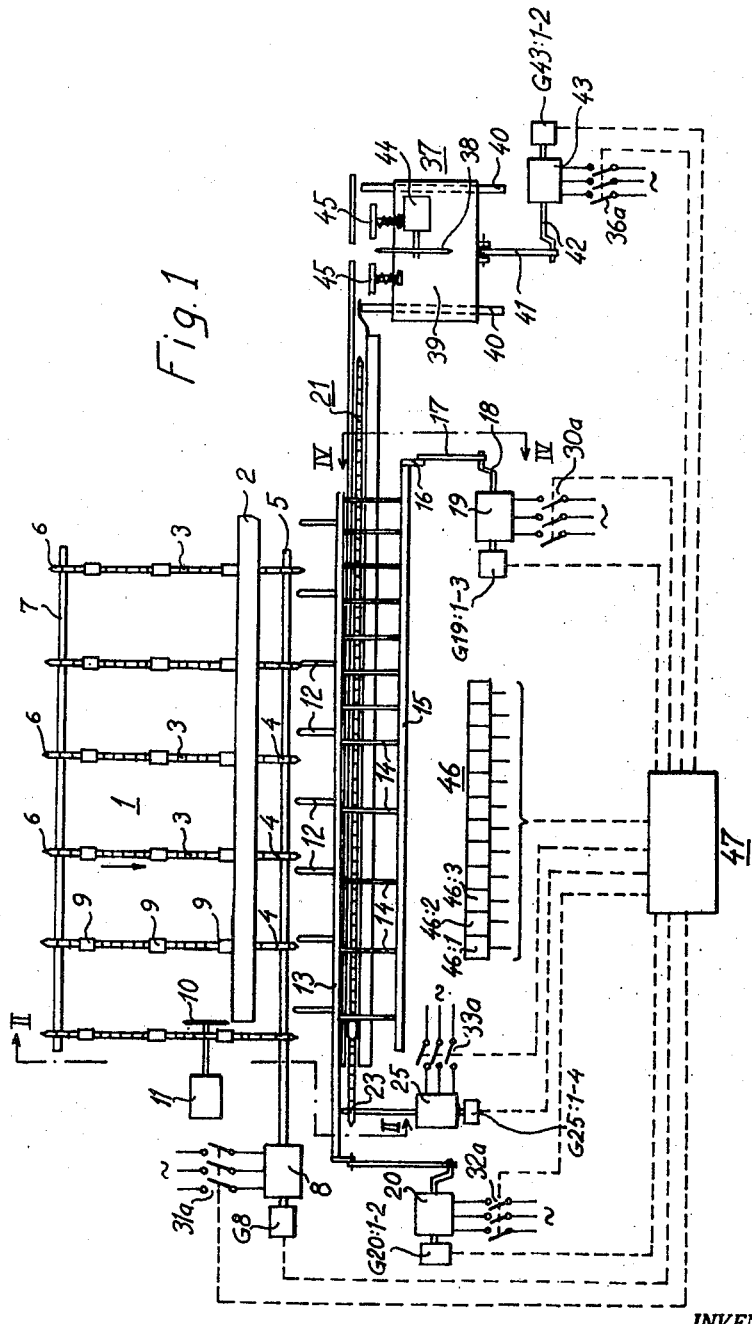
INVENTOR.
BY

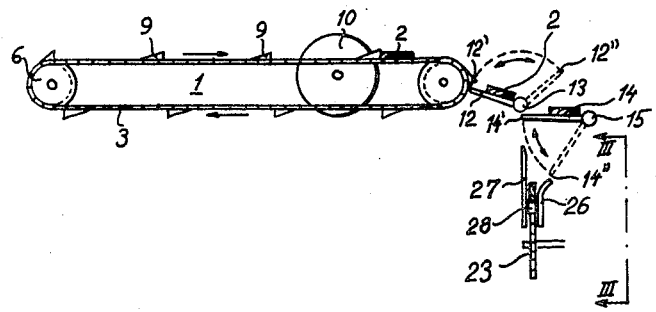
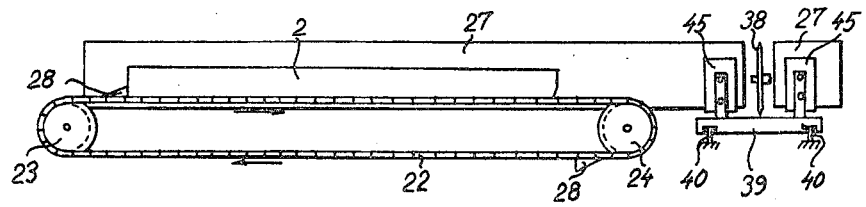
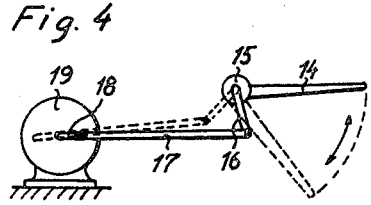

United States Patent Office 3,171,452
Patented Mar. 2, 1965

3,171,452
DEVICE FOR CLASSIFYING BOARDS AS TO QUALITY AND TRIMMING THEM TO DESIRED LENGTHS
Nils Erik Lennart Nydèn, Tunadalsverken, Sundsvall, Sweden
Filed Feb. 12, 1962, Ser. No. 172,573
Claims priority, application Sweden, Oct. 20, 1959, 9,765/59
3 Claims. (Cl. 143—48)

This application is a continuation-in-part of application Serial No. 854,747, filed November 23, 1959, now abandoned.

The present invention relates to a device for inspection and classification of boards and similar oblong wooden objects as to quality and trimming them to proper lengths, particularly standard lengths.

In such a device it is required that an inspector or grader has to inspect both sides of each board in order to determine the quality of the board and the length to which the board is to be cut in order that a board of standard length and desired quality is obtained. The device must further include means for trimming both ends of each board as decided by the grader.

It is one object of the present invention to provide an improved device for classifying boards as to quality and trimming them to standard lengths, which device has a high capacity and requires a minimum of human labour.

Particularly it is the object of the invention to provide a device in which all handling and the trimming of the boards is carried out entirely mechanically so that the grader can concentrate on determining the quality of each board and the length to which it should be trimmed.

A further object of the invention is to provide a device in which, for each board being inspected, a grader has only to press a key on a keyboard representing the length to which the board is to be trimmed, after which the board will be automatically carried away from the inspection station and trimmed to the decided length and a new board will be brought into position for inspection.

To achieve the above mentioned objects a device according to the invention comprises a first conveyor means for moving said boards in a direction perpendicular to their lengths successively past a first trimming means so positioned as to trim one end of each board as it passes said first trimming means, a first group of substantially parallel arms pivoted around a first axis lying adjacent the discharge end of said first conveying means and substantially parallel to said boards as moved by said first conveyor means to receive and support each said board delivered from the discharge end of said first conveyor means with one side of said board facing substantially upwards ready for inspection, means to swing said first group of arms through a substantial arc to raise and invert a board resting thereon and deliver it to a second group of substantially parallel arms pivoted around a second axis lying adjacent and substantially parallel to said first axis to receive and support each inverted board delivered from said first group of arms with its other side facing substantially upwards ready for inspection, means to swing said second group of arms through a substantial arc to deliver a board resting thereon onto a second conveyor means for moving each board in a direction parallel to its length to a second trimming means, a plurality of manually operable signal generating means individually generating, upon actuation, signals representing different lengths, to which a board may be trimmed, means responsive to said signals for storing the information conveyed by said signals, means controlled by said storing means for stopping the movement of said second conveyor means with a board moved by it in a position relative said second trimming means determined by the information stored in said storing means so that the board may be trimmed at the end opposite to the end trimmed by said first trimming means to a length predetermined by actuation of one of said signal generating means.

According to the invention a device according to the preceding paragraph may further comprise means responsive to said signals to start said swinging means for said second group of arms upon actuation of any one of said signal generating means and means responsive to the movement of said second group of arms to start driving means for said second conveyor means and said swinging means for said first group of arms at the end of the swinging movement of said second group of arms.

A device according to the preceding paragraphs may also according to the invention comprise means responsive to the movement of said first group of arms to start driving means for said first conveyor means at the end of the swinging movement of said first group of arms so as to deliver one board to said first group of arms.

A further object of the present invention is a device for classifying boards as to quality and trimming them at both ends to standard lengths, comprising a first conveyor of the type to move said boards in succession in a direction perpendicular to their length, a first trimming means positioned adjacent one side of said first conveyor so as to trim one end of said boards as they pass by said first trimming means, means for intermittently driving said first conveyor to discharge one board at a time at the discharge end of said conveyor, a first group of substantially parallel arms attached to a first rotatable shaft lying adjacent to said discharge end and parallel to the length of the board on said first conveyor to receive and support each board discharged from said first conveyor, means to reciprocatingly rotate said first shaft through less than one revolution to raise and invert a board resting on said first group of arms and deliver it onto a second group of parallel arms attached to a second rotatable shaft lying adjacent and parallel to said first shaft to receive and support each inverted board delivered from said first group of arms, means to reciprocatingly rotate said second shaft through less than one revolution, a second conveyor positioned to receive each board from said second group of arms upon rotation of said second shaft with the trimmed end of said board in a predetermined position on said second conveyor, said second conveyor being of the type to move said board in a direction parallel to its length, a second trimming means positioned along the path of said second conveyor and movable transversely across said path to trim a board resting on said second conveyor, a plurality of individually selectable means responsive to the movement of said second conveyor to stop it with the trimmed end of a board resting thereon at different distances corresponding to different standard lengths from the cutting disc of said second trimming means, manually operated means for preselecting anyone of said selectable means to become effective.

The above and other desirable objects and advantages of the invention will become apparent from the following description, taken in conjunction with the accompanying drawings, in which:

FIG. 1 is a plan view and a schematical electric circuit diagram of one embodiment of a device in accordance with the present invention;

FIG. 2 is a vertical sectional view, taken on the line II—II of FIG. 1;

FIG. 3 is a vertical sectional view, taken on line III—III of FIG. 2;

FIG. 4 is a side view, taken on line IV—IV in FIG. 1, and showing in detail the swinging means for the second group of arms.

Figure 5:
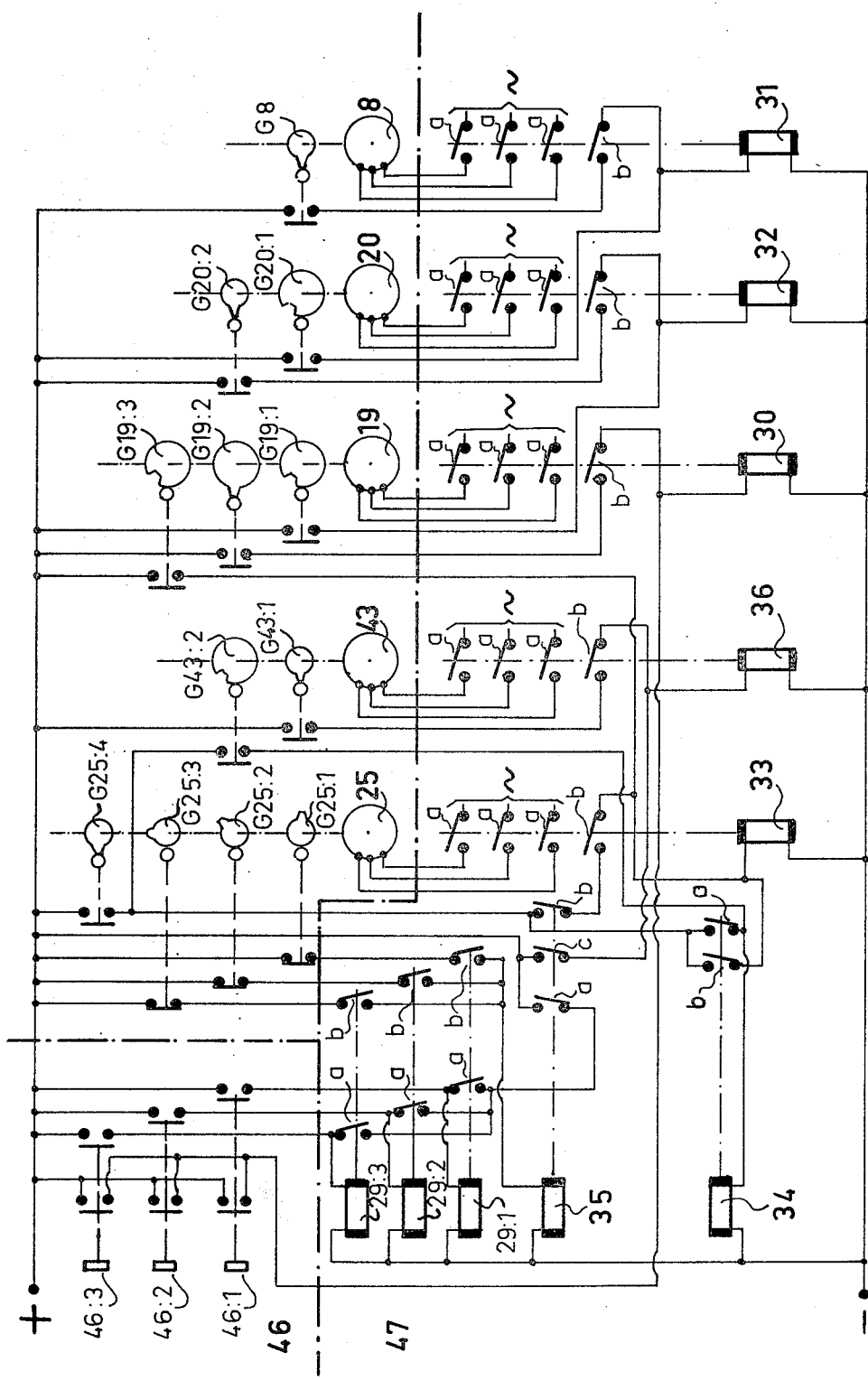
FIG. 5 is a circuit diagram of the electric control and driving means of the device shown in FIG. 1.

Referring to FIGS. 1 to 4 of the drawings, the illustrated device according to the invention comprises a first conveyor, generally indicated by 1, of the type to carry boards 2 to be classified and trimmed, in a direction perpendicular to their length. The conveyor 1 consists of a number of parallel conveyor chains 3 running over driving sprockets 4 attached to a common shaft 5 and idler sprockets 6 attached to a common rotatable shaft 7. The shaft 5 for the driving sprockets 4 may be rotated by an electric motor 8, the supply circuit of which may be closed and opened by means of contacts 31a. A cam-operated limit switch G8 is coupled to the shaft of the motor 8, if necessary through suitable gearing. The limit switch G8 is shown more in detail in FIG. 5. The conveyor chains 3 are provided with lugs 9 arranged to engage the boards 2 and move them towards the discharge end of the conveyor. A circular saw 10 is positioned adjacent one side of the conveyor 1 so as to cut off one end of the boards passing by on the conveyor. During operation of the device the circular saw 10 is driven continuously by an electric motor 11.

At the discharge end of the conveyor 1 a fork-like element is arranged consisting of a plurality of parallel arms 12 attached to a rotatable shaft 13. As apparent from FIGS. 1 and 2 the arms 12 are so positioned relative to the conveyor as to receive and support each board delivered from the conveyor with one side of the board facing upwards so that it may be easily inspected on this side by a grader.

A second similar fork-like element consists of a plurality of arms 14 attached to a rotatable shaft 15. The shaft 15 is provided with a fixed lever 16 which, by means of a connecting rod 17, is coupled to a crank shaft 18 which may be rotated by a motor 19. The shaft 13 of the first fork-like element is in an equivalent way connected to a motor 20. By rotation of the motor 20 the arms 12 may consequently be swung reciprocatably between the positions 12' and 12" in FIG. 2 and correspondingly the arms 14 may be swung between the positions 14' and 14" by rotation of the motor 19. The motor 19 is connected to an alternating current network through contacts 30a, whereas the motor 20 is connected to the network through contacts 32a. Cam-operated limit switches G20:1 and G20:2 are coupled to the shaft of the motor 20, whereas cam-operated limit switches G19:1, G19:2 and G19:3 are coupled to the shaft of the motor 19.

As apparent from FIG. 2 a board 2 resting on the arms 12 is the position 12' will, when the arms 12 by means of the shaft 13 are swung to the position 12", be raised and inverted around its longitudinal axis and delivered to the arms 14. When these arms 14 are swung by means of the shaft 15 from the position 14' to the position 14" a board resting thereon will slide down onto a second conveyor, generally indicated by 21, of the type to move the board 2 in its longitudinal direction to the right in the drawings.

This conveyor 21 consists of a conveyor chain 22 running over a driving sprocket 23 and an idler sprocket 24. The driving sprocket 23 may be rotated by an electric motor 25 which is connected to a supply network through contacts 33a. The shaft of the motor 25 is coupled to a number of cam-operated limit switches G25:1, G25:2, G25:3 and G25:4 through a suitable gearing. The conveyor 21 is further provided with stationary side walls 26 and 27, which guide the board 2, when it slides down onto the conveyor chain 22, and keep it in on-edge position when moved by the conveyor. The conveyor chain 22 is provided with two lugs 28 alternately engaging the trimmed end of a board to be moved by the conveyor. In the starting position of the conveyor one of its lugs 28 lies with its front surface in alignment with the circular saw 10, so that the trimmed end of a board sliding down onto the conveyor chain 22 from the arms 14 will be positioned exactly in front of the lug on the chain. The figures show that the motor 25 driving the sprocket 23 is coupled to a number of cam-operated limit switches G25:1–4. It is evident that the switch G25:4 causes the motor 25 to stop in a position corresponding to the prescribed position of either of the lugs 28. This is only a matter of providing suitable gearing and making an angular adjustment of the cam.

At the end of the conveyor 21 there is provided a second trimming means generally indicated by 37. This trimming means consists substantially of a circular saw 38, which is continuously rotated by an electric motor 44 during the operation of the device. The saw 38 and the motor 44 are mounted on a carriage 39 which may slide along guide rails 40. The carriage, by means of a connecting rod 41, is coupled to a crank shaft 42, which may be rotated by an electric motor 43. The motor 43 is connected to a supply network through contacts 36a and its shaft is coupled to cam-operated limit switches G43:1 and G43:2. Upon rotation of the motor 43 the carriage 39 will consequently reciprocate along the guide rails 40 so that the saw 38 is moved transversely across the path of the conveyor 21 to cut through a board moved into position in front of the saw 38 by the conveyor. The carriage 39 is provided with resilient clamping means 45 which press the board 2 against the side wall 27 on both sides of the path of the saw 38 so as to keep the board in a fixed position during the trimming process.

The device further includes a key-board 46 comprising a plurality of manually operable electric key-switches, 46:1, 46:2, 46:3 and so on, representing different lengths to which the boards may be trimmed by the device.

The operation of the different components in the device is controlled from a control equipment, generally indicated by 47, to which the electric signals from the key-board 46 and the different limit switches are conveyed and which includes relays 30, 31, 32, 33 and 36 (FIG. 5) for operation of the contacts 30a, 31a, 32a 33a and 36a (FIG. 1) lying in the supply circuits to the different motors. The control equipment 47 is shown in detail in FIG. 5.

It should be observed that for the sake of clarity some parts of the device are left out in FIGS. 2 and 3. In FIG. 2, consequently, the trimming means 37 is not shown, whereas in FIG. 3 the side wall 26 and the motor 43, the limit switches G43:1 and G43:2, the crank shaft 42 and the connecting rod 41 are omitted.

The operation of the device is as follows. During continuous operation of the device the conveyor 1 is filled with boards, i.e. there is one board in front of each row of lugs 9. There is further one board resting on the arms 12 and another board resting on the arms 14. In this state it is assumed that all motors of the device, except the motors 11 and 44 for the circular saws 10 and 38, are standing still and all elements of the device are consequently stationary in the positions shown in FIGS. 1, 2 and 3. In this state a grader, who preferably is standing in front of the fork-like elements 12, 13 and 14, 15 respectively can easily inspect the upper sides of the two boards resting on the arms 12 and 14 respectively. The under-side of the board resting on the arms 14 has already been inspected by the grader at an earlier state of the operation as will become apparent from the following. The grader can consequently determine the quality of these two boards resting on the fork-like elements and can also decide to which length the board resting on the arms 14 should be cut down, as this board has now been inspected on both its sides. The arms 14 may, as illustrated in FIG. 1, be so spaced along the shaft 15 as to serve simultaneously as a measuring scale for the length of the boards. When the desired final length of the board lying on the arms 14 has been decided upon, the grader presses the key in the key-board 46 corresponding to the selected length to which the board is to be cut. The electric signal generated by the actuated key is conveyed to the control equipment 47, in which the length represented by this key is stored for future rise. Simultaneously the motor 19 is started to make one revolution so as to swing the arms 14 from the position 14' to the position 14" and back again, which causes the board lying on these arms 14 to slide down onto the conveyor 21 with its trimmed end exactly in front of the lug 28.

Depressing one of the keys 46 will cause a corresponding relay 29 to become energized and the relay will remain energized through its contact. Thus, the control equipment is able to assume a specific state when a specific key has been depressed and to remain in this state, i.e. "store" a value. This value corresponds to a specific length since each relay is associated with one of the cam-operated limit switches G25:1-3. In FIG. 5 these cams are shown each with its notch in a different position with respect to each other. Since they rotate in synchronization with the motor 25, and thus with the sprocket 23, they will open their associated switches when the board is in a predetermined position.

At the end of the swinging movement of the arms 14 the motor 25 for the conveyor 21 is started to move the board now resting on this conveyor to the right in the drawings towards the trimming means 37. As was noted above, a lug 28 on conveyor 21 is positioned so as to be in alignment with the end of the board that was previously trimmed by saw 10. The motor 25 and consequently also the board on the conveyor 21 is automatically stopped by the control equipment 47, when the trimmed end of the board, i.e. the front surface of lug 28, is at a distance from the cutting path of the saw 38 which is equal to the length represented by the actuated key and stored in the control equipment. How this is accomplished is described below.

When the conveyor 21 with the board thereon has stopped, the motor 43 is automatically started to make one revolution, whereby the carriage 39 with the saw 38 is moved transversely across the path of the conveyor 21 and back again, so that the board is cut off to the desired length by the saw 38. When the trimming process is completed the motor 25 is started again, so that the trimmed board is discharged from the conveyor 21 to be carried away from the device by suitable means (not shown). The motor 25 is automatically stopped by operation of the control circuits when the other lug 28 on the conveyor chain 22 has reached the initial position, i.e. lies in alignment with the circular saw 10.

When the arms 14 had completed their swinging movement the motor 20 was also started to make one revolution so as to swing the arms 12 from the position 12' to the position 12" and back again, whereby the board lying on these arms is raised and inverted and delivered onto the arms 14. At the end of the swinging movement of the arms 12 the motor 8 is started to drive the conveyor 1 a distance equal to the distance between two adjacent rows of lugs 9, whereby a board is delivered from the conveyor 1 onto the arms 12. A new board is simultaneously fed to the conveyor 1 by any suitable means (not shown).

In this way one cycle of the operation of the device has been completed, during which one board has been trimmed to the desired length and discharged from the device and new boards have been brought to the fork-like elements 12, 13 and 14, 15 respectively ready for inspection by the grader. The entire operation of the device is consequently fully automatic and the grader does not have to handle or touch the boards in any way, but he can still determine the pace of the operation and the length to which each board shall be cut down merely by actuating one key in the key-board for each inspected board.

The desired automatic operation of the device as described above may be achieved by means of the control equipment shown in FIG. 5. FIG. 5 shows the control equipment 47, three keys 46:1, 46:2 and 46:3 in the key-board 46 representing different lengths of board, the different driving motors 8, 19, 20, 25 and 43 and their associated cam-operated limit-switches.

FIG. 5 shows all components in their initial resting position, which they occupy, when all elements in the device are stationary. It is further assumed that the cam-disks of the limit switches are rotated in a clockwise direction in FIG. 5 upon rotation of associated motors.

Each key 46:1, 46:2 and 46:3 respectively is provided with a first contact lying in the excitation circuit of an associated relay 29:1, 29:2 and 29:3 respectively, and a second contact lying in parallel with the corresponding contacts of the other keys in the excitation circuit of a relay 30. When the grader actuates one of the keys in the key-board 46, e.g. the key 46:2, the associated relay 29:2 will become energized and close its contacts 29:2a and 29:2b. When the contact 29:2b closes an auxiliary relay 35 is energized through this contact and the closed limit switch G25:2 associated with the motor 25 of the conveyor 21. When the relay 35 picks up, it closes its contacts 35a and 35b (FIG. 5). The relay 29:2 consequently becomes self-holding through its one closed contact 29:2a and the contact 35a and will remain energized even when the grader releases the key 46:2. The actuation of the key 46:2 also causes the relay 30 to pick up and close its contacts 30a and 30b. Through the closed contacts 30a the motor 19 for the swinging of the fork-like element 14, 15 will be started and simultaneously rotate the cam-disks of its limit-switches G19:1, G19:2 and G19:3. As apparent from the drawing the limit-switch G19:2 will be closed almost immediately upon rotation of the motor 19, due to which the relay 30 becomes self-holding through this limit switch and its own closed contact 30b and remains energized even when the key 46:2 is released.

After one revolution of the motor 19, i.e. when the movement of the fork-like element 14, 15 is completed, the limit-switch G19:2 opens again, due to which the relay 30 drops out and the motor 19 is stopped. Immediately before the end of the rotation of the motor 19, however, its associated limit-switch G19:3 closes temporarily, so that the relay 33 becomes energized and closes its contacts 33a (FIG. 1) and 33b. The contacts 33a, when closing, start the motor 25 for the conveyor 21, on which a board is now resting. The motor 25 also rotates the cam-disks of limit switches G25:1, G25:2, G25:3 and G25:4. The limit switch G25:4 will close almost at once, so that the relay 33 will become selfholding through this limit-switch and the closed contacts 35b and 33b and remain energized, even when the limit switch G19:3 opens again. The limit switches G25:1-4 are coupled to the motor 25 through a gearing such that one revolution of the cam-disks corresponds to half a revolution of the conveyor chain 22, i.e. that the two lugs 28 are caused to change place with one another.

When the conveyor 21 with the board thereon has been moved a certain distance, the limit switch G25:2 is opened and interrupts the energizing circuit for relay 35, which drops out and opens its contacts 35a and 35b. The contact 35b breaks the current to the relay 33 which drops out and opens its contacts 33a and 33b so that the motor 25 and the conveyor 21 are stopped. It is apparent that the position in which the conveyor 21 with the board thereon is stopped is determined by the position of the cam-disk of the limit switch G25:2 which as described above, was selected to become effective by actuation of the key 46:2. The other two equivalent limit-switches G25:1 and G25:3, as is readily seen, may be selected to become effective by actuation of the keys 46:1 and 46:3 respectively. As the cam-disks of the three limit switches G25:1-3 have their cam-notches positioned in different angles they will consequently stop the conveyor 21 and the board thereon in different positions, so that the board will be trimmed to different lengths as determined by the actuation of the keys in the key-board.

When the relay 35 dropped out it also opened its contact 35a, due to which the self-holding circuit for the energized relay 29:2 is interrupted and this relay drops out and opens its contacts 29:2a and 29:2b. As the contact 29:2b is opened and will remain open, the relay 35 can not pick up again if the limit switch should close again.

When the relay 35 drops out it further closes temporarily its contact 35c, which is of the type to close temporarily when the relay drops out but to remain open at all other times. The contact 35c will, when closed, energize the relay 36, which picks up and closes its contacts 36a and 36b. The contacts 36a will then start the motor 43 for the carriage 39 for the saw 38 to move the carriage with the saw transversely across the path of the conveyor 21 so that the saw cuts off the board resting on the conveyor, in the manner previously described. The motor 43 rotates also the cam-disks of its associated limit-switches G43:1 and G43:2. The limit switch G43:1 closes almost at once, so that the relay becomes self-holding through this limit switch and its own contact 36b and will remain energized when the contact 35c opens again. At the end of one revolution of the motor 43, i.e. when the reciprocating movement of the carriage 39 and the trimming of the board has been completed, the limit switch G43:1 is opened again, so that the relay 36 drops out and the motor 43 is stopped. Immediately before the stopping of the motor 43, however, the limit switch G43:2 is temporarily closed, due to which the relay 34 picks-up and becomes self-holding through its own closed contact 34a and the limit switch G25:4, which is still closed as its cam-disk has not yet completed one revolution. The relay 34 closes also its contact 34b, so that the relay 33 picks-up again and starts the motor 25 to move the conveyor 21 so as to discharge the board thereon, which is now trimmed to the desired length.

When the conveyor 21 has returned to its starting position with one of the lugs 28 in alignment with the saw 10, i.e. when the cam-disk of the limit switch G25:4 has made one revolution, this limit switch is opened, so that both the relays 33 and 34 drop out and the motor 25 with the conveyor 21 is stopped.

Immediately before the end of the swinging movement of the forklike element 14, 15 by means of the motor 19 the associated limit switch G19:1 was also closed temporarily to energize the relay 32, which then picks up and closes its contacts 32a and 32b. The contacts 32a then start the motor 20 for the swinging movement of the fork-like element 12, 13. Upon rotation of the motor 20 the limit switch G20:2 is closed so as to provide a self-holding circuit for the relay 32. When the motor 20 has made one revolution, i.e. when the swinging movement of the fork-like element, G20:2 is opened again, the relay 32 drops out and stops the motor 20. Immediately before this, however, the limit switch G20:1 is temporarily closed to energize relay 31, which closes its contacts 31a and 31b, whereby the motor 8 is started to drive the conveyor 1. The relay 31 becomes self-holding through the limit switch 68, which is closed when the motor 8 starts to rotate, and the contact 30b. When the motor 8 has rotated the cam-disk and its associated limit switch G8 one revolution, this limit switch is opened again, so that the relay 31 drops out and stops the motor 8 and the conveyor 1. The cam-disk of the limit switch G8 is coupled to the shaft of the motor 8 through a gearing such that one revolution of the cam-disk corresponds to a movement of the conveyor 1 equal to the distance between two adjacent rows of lugs, i.e. the conveyor 1 will deliver one board to the fork-like element 12, 13 each time the motor 8 is started.

When the conveyor 1 has stopped as described above, the device has completed one cycle of its operation and has returned to its initial state with all elements stationary and a new key in the key-board 46 can now be actuated for the trimming of the next board.

It should be observed that the invention is not restricted to the particular embodiment thereof as shown and described above. It should be apparent to those skilled in the art that various modifications in arrangement and detail are possible within the true spirit and scope of the invention. For instance the relays in the control equipment may be replaced by other types of components capable of fulfilling the same purpose as transistors for example, and the limit switches do not of course have to be mechanically operated by cam-disks, but may instead be of the photo-electric or magnetic type. In practice it may be necessary to use special circuit breakers to close and open the supply circuits to the different driving motors, in which case these circuit-breakers are controlled by contacts on the associated relays 30, 31, 32, 33 and 36.

What is claimed is:

1. In a device for classifying boards and similar oblong wooden objects as to quality, and trimming them to proper lengths, a first trimming means, a first conveyor means for moving said boards in a direction perpendicular to their lengths successively past said first trimming means, so positioned as to trim one end of each board as it passes said first trimming means, a first group of substantially parallel arms pivoted around a first axis lying adjacent the discharge end of said first conveying means and substantially parallel to said boards, as they are moved by said first conveyor means, to receive and support each said board delivered from the discharge end of said first conveyor means with one side of said board facing substantially upwardly ready for inspection, a second group of substantially parallel arms pivoted around a second axis lying adjacent and substantially parallel to said first axis to receive and support each inverted board delivered from said first group of arms, means to swing said first group of arms through a substantial arc to raise and invert a board resting thereon and deliver it to said second group of arms with its other side facing substantially upwardly ready for inspection, a second conveyor means perpendicular to said first conveyor means, means to swing said second group of arms through a substantial arc to deliver a board resting thereon onto said second conveyor means for moving each board in succession in a direction parallel to its length, said second conveyor means including a second trimming means, driving means for said second conveyor means, a control system for said driving means comprising a plurality of manually operated selective signal generating means each generating, upon actuation, a signal representing a different length to which a board may be trimmed, means responsive to each of said signals for storing the information conveyed by the selected signal, means controlled by said storing means for stopping the movement of said second conveyor means in a position relative to said second trimming means determined by the information stored in said storing means so that a board carried by said second conveying means may be trimmed at the end opposite to the end trimmed by said first trimming means to a length predetermined by selective actuation of one of said signal generating means, and means for starting said second trimming means when said second conveyor means has been stopped.

2. A control system as claimed in claim 1, in which said control system comprises a plurality of parallel circuits for operating said second conveyor means, each circuit including a contact affected by one of a plurality of cams travelling in synchronization with said conveyor means, each cam being arranged to interrupt its associated circuit at a predetermined position of said conveyor means so that the board may be cut to a predetermined length, each circuit also including in series a contact associated with a storing means affected by said signal generating means, said second contact closing when its corresponding signal generating means has been manually operated, said plurality of circuits being arranged in series with a control means for the driving means for the conveyor means so that the motor is stopped when the conveyor means has reached a predetermined position, said position being determined by the position of one of said cams and said storing means.

3. In a device for classifying boards and other oblong wooden objects as to quality, and trimming them to a selected length as described in claim 1, means for aiding in determining to what length a board should be cut in order that the correct signal operating means may be selected consisting of said second group of parallel arms being disposed at predetermined distances from each other so that the distances or the sum of consecutive distances between said arms constitute standard lengths.

References Cited in the file of this patent

UNITED STATES PATENTS

| | | |
|---|---|---|
| 785,328 | Pless | Mar. 21, 1905 |
| 2,253,453 | Van Deinse | Aug. 19, 1941 |
| 2,506,087 | Kadell | May 2, 1950 |
| 2,527,024 | Mitchell | Oct. 24, 1950 |
| 2,565,779 | Muddiman | Aug. 28, 1951 |
| 2,918,951 | Haumann | Dec. 29, 1959 |
| 3,044,508 | Sherman | July 17, 1962 |

FOREIGN PATENTS

| | | |
|---|---|---|
| 137,725 | Sweden | Oct. 21, 1952 |